(12) United States Patent  (10) Patent No.: US 9,247,259 B2
Rozen et al.  (45) Date of Patent: Jan. 26, 2016

(54) CONTROL OF VIDEO COMPRESSION BASED ON FILE SIZE CONSTRAINT

(75) Inventors: Shaul Rozen, Nes Ziona (IL); Dan Raudnitz, Hod-Hasharon (IL); Yosef Wexlur, Shimshit (IL)

(73) Assignee: FLASH NETWORKS LTD., Herzliya (IL)

(\*) Notice: Subject to any disclaimer, the term of this patent is extended or adjusted under 35 U.S.C. 154(b) by 1644 days.

(21) Appl. No.: 11/870,060

(22) Filed: Oct. 10, 2007

(65) Prior Publication Data

US 2008/0084925 A1 Apr. 10, 2008

Related U.S. Application Data

(60) Provisional application No. 60/850,335, filed on Oct. 10, 2006.

(51) Int. Cl.
*H04N 19/40* (2014.01)
*H04N 19/176* (2014.01)
*H04N 19/172* (2014.01)
*H04N 19/61* (2014.01)
*H04N 19/124* (2014.01)
*H04N 19/132* (2014.01)
*H04N 19/152* (2014.01)
*H04N 19/85* (2014.01)

(52) U.S. Cl.
CPC ............ *H04N 19/40* (2014.11); *H04N 19/124* (2014.11); *H04N 19/132* (2014.11); *H04N 19/152* (2014.11); *H04N 19/172* (2014.11); *H04N 19/176* (2014.11); *H04N 19/61* (2014.11); *H04N 19/85* (2014.11)

(58) Field of Classification Search
CPC ... H04N 19/24; H04N 19/132; H04N 19/152; H04N 19/172; H04N 19/176; H04N 19/40; H04N 19/61; H04N 19/85

USPC ...................................................... 375/240.01
See application file for complete search history.

(56) References Cited

U.S. PATENT DOCUMENTS

| 5,867,230 A * | 2/1999 | Wang ................. H04N 7/17336 348/423.1 |
| 6,381,465 B1 | 4/2002 | Chern et al. |
| 6,563,517 B1 | 5/2003 | Bhagwat et al. |
| 6,931,159 B2 | 8/2005 | Ridge |
| 6,970,602 B1 | 11/2005 | Smith et al. |

(Continued)

FOREIGN PATENT DOCUMENTS

WO 2006085301 8/2006

OTHER PUBLICATIONS

U.S. Appl. No. 60/850,335, filed Oct. 10, 2006.
ITU-T Recommendation H.264. "Advanced Video Coding for Generic Audiovisual Services." International Communication Union, Mar. 2005.

(Continued)

*Primary Examiner* — Huy D Vu
*Assistant Examiner* — Stephen J Clawson
(74) *Attorney, Agent, or Firm* — D.Kligler IP Services Ltd.

(57) ABSTRACT

A method for processing data includes receiving an image sequence including a succession of image frames for encoding in an image sequence file. A target size of the image sequence file is specified. The image sequence file is generated by encoding the succession of the image frames using at least one variable compression parameter, which is adjusted during the encoding responsively to the target size. The image sequence file is outputted for transmission over a communication link.

23 Claims, 4 Drawing Sheets

(56) References Cited

U.S. PATENT DOCUMENTS

| | | | |
|---|---|---|---|
| 6,995,769 | B2 | 2/2006 | Ordentlich et al. |
| 2002/0022476 | A1 | 2/2002 | Go |
| 2002/0090029 | A1* | 7/2002 | Kim ..................... 375/240.03 |
| 2002/0090140 | A1 | 7/2002 | Thirsk |
| 2002/0169823 | A1 | 11/2002 | Coulombe et al. |
| 2002/0172418 | A1 | 11/2002 | Hu |
| 2002/0177454 | A1 | 11/2002 | Karri et al. |
| 2003/0007559 | A1* | 1/2003 | Lallet et al. ............. 375/240.03 |
| 2004/0165783 | A1 | 8/2004 | Reynolds et al. |
| 2004/0252238 | A1 | 12/2004 | Park et al. |
| 2005/0058197 | A1* | 3/2005 | Lu et al. ................. 375/240.03 |
| 2005/0122427 | A1 | 6/2005 | Hougui et al. |
| 2005/0254578 | A1* | 11/2005 | Muthukrinan et al. .. 375/240.03 |
| 2006/0141923 | A1 | 6/2006 | Goss |
| 2008/0046920 | A1 | 2/2008 | Bill |
| 2009/0106093 | A1 | 4/2009 | Folgner et al. |

OTHER PUBLICATIONS

Li, Z. et al. "Adaptive Rate Control with HRD Consideration." JVT-H014, Joint Video Team of ISO/IEC MPEG & ITU-T VCEG. 8th meeting, Geneva, May 20-26, 2003.

Wai Yip Lum; Lau, F.C.M.; "A context-aware decision engine for content adaptation", Pervasive Computing, IEEE, vol. 1, No. 3, pp. 41-49, 2002 doi: 10.1109/MPRV.2002.1037721.

Vetro A.; Christopoulos, C; Huifang Sun;, "Video transcoding architectures and techniques: an overview", Signal Processing Magazine, IEEE, vol. 20, No. 2, pp. 18-29, Mar. 2003 doi: 10.1109/MSP.2003.1184336.

An Office Action dated May 24, 2011 which issued during the prosecution of U.S. Appl. No. 11/815,648.

An Office Action dated Aug. 2, 2012, which issued during the prosecution of U.S. Appl. No. 12/526,185.

* cited by examiner

CONTROL OF VIDEO COMPRESSION BASED ON FILE SIZE CONSTRAINT

CROSS-REFERENCE TO RELATED APPLICATIONS

This application claims the benefit of U.S. Provisional Patent Application 60/850,335, filed Oct. 10, 2006, which is incorporated herein by reference.

COPYRIGHT NOTICE

Program listings in the disclosure of the provisional patent application cited below contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to image adaptation and compression, and particularly to methods and systems for compressing image sequences to match specified target size constraints.

BACKGROUND OF THE INVENTION

Current standards for video compression permit image sequences to be compressed for transmission at relatively low bit rates, while providing flexible control of compression parameters in order to suit different networks and systems with different bit rates. Probably the most advanced video compression standard that is currently in broad use is ITU-T Recommendation H.264, "Advanced Video Coding for Generic Audiovisual Services" (International Telecommunication Union, March, 2005), which is incorporated herein by reference. This standard uses inter-picture prediction to encode image frames using previous frames in the sequence as references, as well as both lossless and lossy techniques for compressing image data within a frame.

A video encoder may employ rate control as a way to regulate varying compression characteristics of coded image frames in a video sequence, so as to produce an output bitstream at a given target bit rate. For H.264 encoders, for example, the degree of quantization of compressed image coefficients may be varied in order to achieve the desired output bit rate. Li et al. describe an adaptive rate control scheme that may be used for H.264 in "Adaptive Rate Control with HRD Consideration," published as document JVT-H014, Joint Video Team (JVT) of ISO/IEC MPEG & ITU-T VCEG (ISO/IEC JTC1/SC29/WG11 and ITU-T SG16 Q.6), 8th Meeting (Geneva, May 20-26, 2003), which is incorporated herein by reference.

PCT International Publication WO 2006/085301, whose disclosure is incorporated herein by reference, describes a method for image adaptation based on a target size requirement. This publication points out that in some applications, it is desirable to adapt an image so as to comply with certain target characteristics, such as target file size and/or resolution. For example, some communication systems send images to be displayed by mobile communication terminals. The mobile terminals often have limited processing, memory and/or display capabilities. In such applications it is often desirable to adapt the images sent to a particular terminal in order to match the terminal capabilities, a process commonly referred to as media adaptation. Target file size limitations may also be imposed by the system to reduce traffic load. The publication describes a method by which an input image is modified by optimally determining at least one of the resolution and the quality of the input image so as to produce a compressed output image meeting the target size requirement.

SUMMARY OF THE INVENTION

In some data communication and storage applications, the file size of encoded image sequences is subject to predetermined limits. For example, in mobile communication networks that offer multimedia messaging service (MMS), in which compressed image sequences may be transmitted as files in MMS messages, there may be a limit on the message size due to terminal capabilities, network bandwidth, and/or constraints imposed by the network operator. To meet such limits, image sequences may be encoded using compression parameters that are estimated in advance to give a file size that will not exceed the applicable limit. In general, however, such techniques do not make optimal use of the available bandwidth. Therefore, when the image sequence is decoded at the receiving terminal, it often contains pictures that are blurry and movement that "jumps" due to dropped frames.

Embodiments of the present invention that are described hereinbelow provide methods and systems for image sequence encoding that provide near-optimal decoded image quality for a given target file size. In these methods, one or more variable encoding parameters are controlled dynamically, during encoding of the succession of image frames in the sequence, in response to the target file size. These parameters, which may vary from frame to frame, typically determine which frames in the succession to drop and/or how strongly to compress the remaining frames. As a result of this encoding technique, the image sequence can be encoded to a size that is close to (but no greater than) the target size in a single pass through the sequence.

There is therefore provided, in accordance with an embodiment of the present invention, a method for processing data, including:

receiving an image sequence including a succession of image frames for encoding in an image sequence file;

specifying a target size of the image sequence file;

generating the image sequence file by encoding the succession of the image frames using at least one variable compression parameter, which is adjusted during the encoding responsively to the target size; and outputting the image sequence file for transmission over a communication link.

In some embodiments, the at least one variable compression parameter includes a quantization parameter. Typically, encoding the succession of the image frames includes determining a buffer level of a virtual buffer responsively to a cumulative data volume of the image frames preceding a given frame in the succession, and setting the quantization parameter responsively to the buffer level. Additionally or alternatively, encoding the succession of the image frames includes dividing each of the image frames into a plurality of basic units, and setting the quantization parameter respectively for each of the basic units in each of the image frames. Further alternatively or additionally, the at least one variable compression parameter includes a skip frame parameter, which is set so as to cause at least one of the image frames to be dropped from the image sequence file.

In some embodiments, encoding the succession of the image frames includes defining a virtual buffer size responsively to the target size, defining a buffer overflow curve indicating an amount by which a data volume at each frame in the image sequence file is permitted to exceed a working point indicated by the virtual buffer size, and controlling the variable compression parameter while encoding the data so that the data volume remains within a bound indicated by the buffer overflow curve. Typically, the bound indicated by the buffer overflow curve decreases monotonically over at least a final portion of the succession of the image frames. Additionally or alternatively, controlling the variable compression parameter includes dropping a given frame from the image sequence file upon determining that inclusion of the given frame in the image sequence file will cause the data volume to exceed the bound indicated by the buffer overflow curve for the given frame.

In a disclosed embodiment, encoding the succession of the image frames includes compressing the image sequence in a single pass through the succession of the image frames. Typically, the image sequence file generated in the single pass has a file size that is no greater than the target size and no less than 90% of the target size, and may be no less than 98% of the target size.

There is also provided, in accordance with an embodiment of the present invention, apparatus for processing data, including:

a memory, which is configured to receive an image sequence including a succession of image frames for encoding in an image sequence file; and a processor, which is coupled to generate the image sequence file by encoding the succession of the image frames using at least one variable compression parameter, while adjusting the at least one variable compression parameter during the encoding responsively to a specified target size of the image sequence file, and to output the image sequence file for transmission over a communication link.

There is additionally provided, in accordance with an embodiment of the present invention, a computer software product, including a computer-readable medium in which program instructions are stored, which instructions, when read by a computer, cause the computer to receive an image sequence including a succession of image frames for encoding in an image sequence file, and to generate the image sequence file by encoding the succession of the image frames using at least one variable compression parameter, while adjusting the at least one variable compression parameter during the encoding responsively to a specified target size of the image sequence file, and to output the image sequence file for transmission over a communication link.

The present invention will be more fully understood from the following detailed description of the embodiments thereof, taken together with the drawings in which:

DETAILED DESCRIPTION OF EMBODIMENTS

Figure 1:
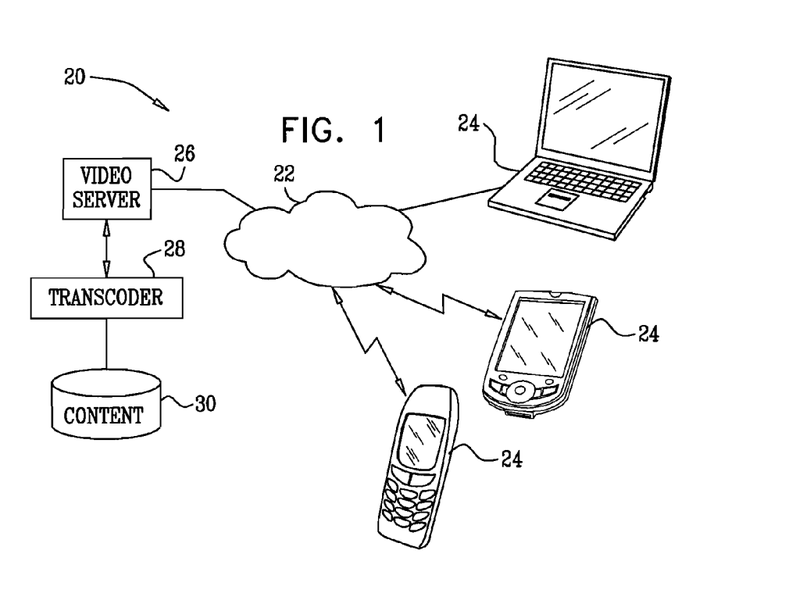
FIG. 1 is a block diagram that schematically illustrates a system for image sequence encoding and transmission, in accordance with an embodiment of the present invention.

FIG. 1 is a block diagram that schematically illustrates a system 20 for image sequence encoding and transmission, in accordance with an embodiment of the present invention. In the description that follows, the image sequences in question are assumed to be video sequences, i.e., electronic moving pictures that are formatted for display on a video screen. The terms "image sequence" and "video sequence" are therefore used synonymously in the description that follows. It should be understood, however, that the principles of the present invention are applicable to any sort of electronic image sequences, even if such sequences might not be strictly classified as "video."

In system 20, a video server 26 transmits encoded video sequences over a communication network 22 to client devices 24. The client devices may comprise substantially any sort of computing and communication devices with suitable communication and display capabilities, such as cellular telephones, personal digital assistants, and personal computers, and may be linked to network 22 by either wireless or wired links. Server 26 typically transmits encoded video sequences in the form of files carried by messages sent to devices 24. For example, server 26 may comprise a MMS server and may transmit the video sequences in the form of MMS messages. As noted earlier, the size of a given message (and hence of the file transmitted in the message) may be limited in advance by factors such as the memory and/or display capabilities of the receiving device, the bandwidth of the link connecting the server to the receiving device, and message size constraints imposed by the operator of network 22 and/or server 26. Alternatively, server 26 may be configured for other sorts of video applications. For example, control of output file size, as described hereinbelow, may also be used in video on demand (VOD) download applications, in which video is transferred by streaming.

In order to meet these limits, a transcoding processor 28 encodes the video sequences in files of the appropriate size for transmission by video server 26. Transcoding processor 28 may be implemented as a component of video server 26, or it may alternatively comprise a standalone, dedicated device. Typically, processor 28 (whether standalone or integrated with the video server) comprises a general-purpose computer, which is programmed in software to carry out the functions that are described herein. The software may be downloaded to processor 28 in electronic form, over a network, for example. Alternatively or additionally, the software may be provided and/or stored on tangible media, such as optical, magnetic, or electronic memory media. As another alternative, some or all of the functions of the transcoding processor may be implemented using hard-wired or programmable hardware components.

In response to a request (from a client or other source) to transmit a MMS message containing a given video file to a particular client, video server 26 passes an instruction to transcoding processor 28 to provide the desired video sequence in a file of the appropriate size. Typically, the transcoding processor reads the original video sequence via an input from a memory 30, which may serve as a content repository. Alternatively, the video server may stream the video sequence to the input of the transcoding processor, or the video sequence may be provided from another source. For example, the video source may be a Web portal or another client, and the video sequence may have been captured by a suitable camera at the source. The video server (or a control input from another source) specifies the target size of the video file, depending on constraints such as those noted above. The constraints may be stored, for example, in a device capabilities database.

Transcoding processor 28 reads the desired video sequence (from memory 30 or from another source) and transcodes the sequence, if necessary, to a size that is no greater than the target size, using the methods that are described hereinbelow. The transcoding processor then passes the transcoded file to the video server for transmission over network 22. Alternatively or additionally, transcoding processor 30 may transcode video sequences to given target sizes in advance, and may then convey these files back to memory 30 or to another memory for storage until needed.

The methods applied by transcoding processor 28, which are described in detail hereinbelow, permit the transcoding processor to generate a video file of the appropriate size on the fly, i.e., in a single pass through the succession of images in the video sequence. The "appropriate size" in this case means a size that is no greater than the target file size, but is also not much smaller, so that when the client device receives and decodes the video sequence, the quality is nearly optimal for the given file size constraint. "Nearly optimal" in this sense means that the sequence shown on the display of the client device is not noticeably jumpy, and the visual quality of the images in the sequence is consistent, at a level that is as good as can be achieved subject to the file size constraint without cutting off frames at the beginning and/or end of the sequence. (Cutting off these initial or final frames might otherwise be necessary if the file size following the pass through the succession of images is still larger than the target size.) Typically, the methods described hereinbelow are capable of generating output video files in a single pass that are no less than 90% of the target file size, and may be no less than 98% of the target file size.

Figure 2:
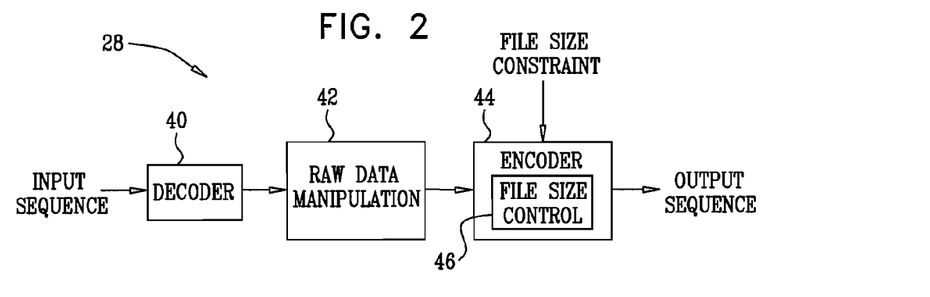
FIG. 2 is a block diagram that schematically shows functional components of a video transcoding processor, in accordance with an embodiment of the present invention.

FIG. 2 is a block diagram that schematically shows functional components of transcoding processor 28, in accordance with an embodiment of the present invention. These functional components of the transcoding processor do not necessarily correspond to separate physical components, and may simply be implemented as different software functions running on the same computer. A decoder 40 serves as the input interface to the transcoding processor. The decoder receives the input video sequence that is to be transcoded into the output video sequence file, and converts this sequence from its original encoded format into a sequence of "raw" color images in a suitable format for subsequent manipulation and encoding. For example, the decoder may generate a sequence of YUV 4:2:0 images, or images in any other suitable format. Alternatively, if the input video sequence is provided in a suitable raw format, then no decoding is required at this stage.

Optionally, a raw data manipulation module 42 performs pre-encoding processing functions on the raw images. These functions may include, for example, image enhancement, resizing, resampling (to a higher or lower image resolution and/or frame rate), fade in/out, and/or addition of a logo image or sequence. Substantially any suitable type of image processing function that is known in the art may be used in module 42 in order to prepare the images for encoding. The specific functions that are carried out in module 42 are beyond the scope of the present invention.

A video encoding module 44 encodes the sequence of video frames to generate the encoded video sequence file that is output to video server 26. The encoding process is subject to the file size constraint specified by the video server. A file size controller 46 monitors the cumulative data volume of the output sequence following each frame and adjusts the compression parameters of the encoding module accordingly, in order to ensure that the encoded video sequence file as a whole meets the file size constraint. Although file size controller 46 may be conveniently implemented within video encoding module 44, as shown in FIG. 2, this controller may alternatively comprise a separate component in communication with the video encoding module.

Figure 3:
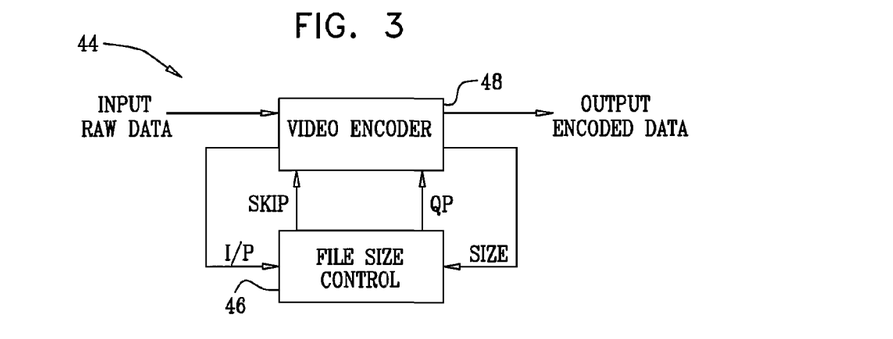
FIG. 3 is a block diagram that schematically shows details of a video encoding module, in accordance with an embodiment of the present invention.

FIG. 3 is a block diagram that schematically shows details of video encoding module 44, in accordance with an embodiment of the present invention. A video encoder 48 receives the raw data from module 42 and encodes the data in accordance with the appropriate standard to generate the encoded output data for the video sequence file. For example, encoder 48 may use the H.264 encoding standard. This standard encodes video sequences as a succession of I-frames and P-frames. (I-frames are "intra coded," meaning that they can be reconstructed without reference to other frames, whereas P-frames are predicted based on the previous I- or P-frame. Optionally, the encoder may be configured to use B-frames, as well.) It also supports controlled quantization of transformed image coefficients, so that the quality of the decoded images may be traded off against the data volume by varying the quantization.

For each input frame that is processed by video encoder 48, the encoder informs file size controller 46 of the data size (data volume) of the encoded frame and whether the frame was an I-frame or a P-frame. Typically, I-frames require a larger data volume than P-frames, and controller 46 may therefore apply less stringent data size control to I-frames, as described hereinbelow. Optionally, the encoder may inform the file size controller not only of the frame data size, but also of the data size of each encoded macro-block or basic unit in the frame. In response to the I/P and data size inputs, controller 46 outputs instructions to encoder 48 that control certain variable compression parameters. In this embodiment, these parameters include a quantization parameter (QP) and a skip frame parameter.

The quantization parameter indicates the depth of quantization to be applied to the transform coefficients of each basic unit in the encoded images. The basic units for this purpose may be as small as a single macro-block (a 16×16 group of pixels that are encoded together according to H.264) or as large as an entire frame. Typically, it is convenient to define each basic unit as comprising a single row of macro-blocks in a frame. The larger the quantization parameter that is set by the controller, the smaller will be the resulting file size and the lower the visual quality of the decoded image sequence.

On the other hand, it sometimes occurs that even when a large quantization parameter is used, the data size reported to controller 46 by encoder 48 may be larger than the permitted size limit at the given point in the video sequence, or the resulting quality degradation may be too extreme. In this case, the controller sets the skip frame parameter, in order to cause the encoder to drop a frame (typically the current frame, although the encoder may alternatively be configured to drop a subsequent frame). The frame skip mechanism is used particularly in cases of low bitrate combined with high motion in the video sequence, which may together require this sort of measure in order to keep the cumulative data volume within the permitted size limit. The size limits that may be imposed in this regard are described hereinbelow with reference to FIG. 6.

Figure 4:
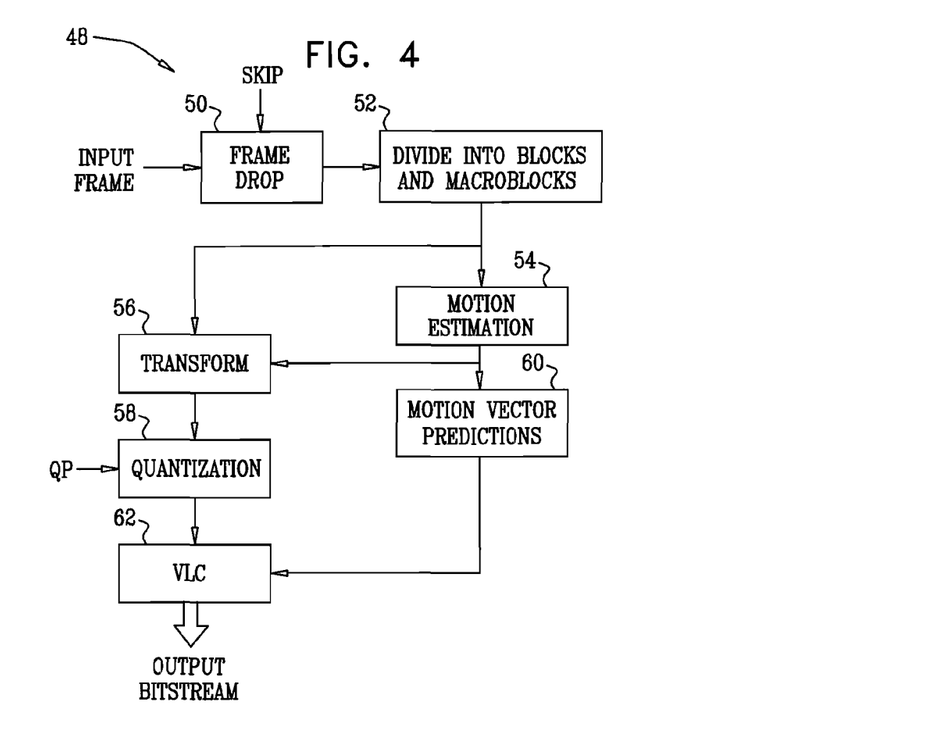
FIG. 4 is a block diagram that schematically shows details of a video encoder, in accordance with an embodiment of the present invention.

FIG. 4 is a block diagram that schematically shows details of encoder 48, in accordance with an embodiment of the present invention. The elements of encoder 48 are largely in accordance with the reference implementation provided by the H.264 Recommendation, and the detailed implementation of these elements is beyond the scope of the present invention. The elements of the encoder will be described here briefly, however, in order to point out how the variable compression parameters generated by controller 46 are used in controlling the operation of the encoder.

When encoder 48 receives an input frame, a frame drop module 50 decides whether to encode or drop the frame depending upon whether controller 46 has set the skip frame parameter. Alternatively, in some embodiments, controller 46 may decide whether a given frame should be dropped depending on the encoded data size of the frame, which is known only after encoder 48 has processed the frame. In such embodiments, frame drop module 50 may be placed in the output bitstream of the encoder, rather than at the input as is shown in FIG. 4. When the last encoded frame is dropped in this manner, the encoder state prior to encoding the last frame is restored and used in encoding the next frame.

As long as the current frame has not been dropped, a block divider 52 divides the frame into macro-blocks, as defined above. Typically, within each frame, the macro-blocks are encoded in raster order. For P-frames, a motion estimation module 54 compares the pixel values in each macro-block to the pixel values in the preceding frame in order to determine a motion vector for the macro-block. This motion vector will enable the receiver to reconstruct the P-frame from the preceding frame. A motion vector prediction module 60 compresses the motion vectors to achieve greater compression of the video sequence.

The difference between the actual pixel values in each macro-block and the pixel values that are predicted for the macro-block based on the previous frame and the applicable motion vector gives the texture data for the macro-block. A transformation module 56 transforms the texture data into a set of coefficients in the frequency domain. For I frames, module 56 transforms the actual image data (without motion prediction) to the frequency domain. These coefficients are truncated to a desired data size by a quantization module 58, in accordance with the quantization parameter dictated by controller 46. The greater this parameter, the more severely will the coefficients be truncated, and thus the smaller will be the data size of the frame. Specifically, increasing the quantization parameter suppresses the high-frequency coefficients, thus reducing the compressed image size at the expense of the fine detail in the decoded image. As noted above, the controller may adjust the quantization parameter separately for each basic unit processed by the encoder.

A coding module 62 combines the motion vector information from module 60 and the quantized coefficients from module 58 to generate an output bitstream. The data may be further compressed using techniques such as variable-length coding (VLC). The output bitstream is encapsulated in a file for transmission by video server 26.

Figure 5:
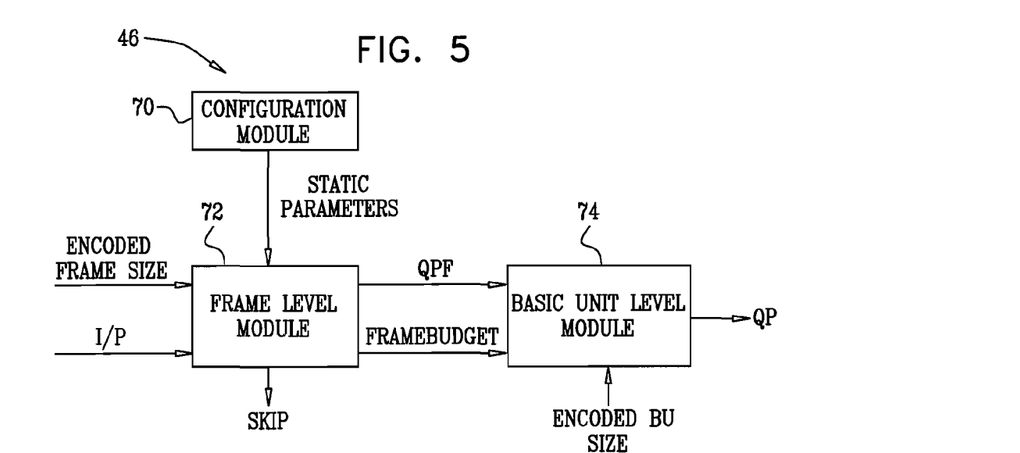
FIG. 5 is a block diagram that schematically shows details of a file size controller, in accordance with an embodiment of the present invention.

FIG. 5 is a block diagram that schematically shows details of file size controller 46, in accordance with an embodiment of the present invention. A configuration module 70 sets static parameters that are used by controller 46 in computing the compression parameters that are output to encoder 48. These static parameters and their use in the operation of controller 46 are described below with reference to FIG. 6. A frame-level module 72 uses the static parameters, along with the I/P frame indication and the data size of the preceding encoded frame to calculate the frame budget for the current frame (i.e., the number of bits available for encoding the frame), as well as a frame quantization parameter (QPF). In case of data size overflow, module 72 passes over the current frame and issues a skip command to encoder 48.

A basic unit-level module 74 generates the QP value for each basic unit processed by encoder 48. This value depends on the frame budget and QPF provided by module 72, and may also depend on the size of the preceding basic unit following encoding. For the first basic unit in a frame, QP=QPF, but the QP value may change for subsequent basic units.

Figure 6:
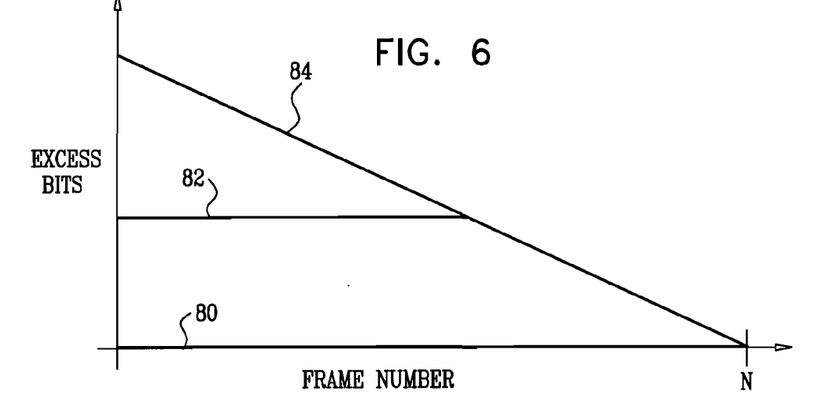
FIG. 6 is a schematic plot of a buffer overflow curve, in accordance with an embodiment of the present invention.

FIG. 6 is a schematic plot of a buffer overflow curve 84, which is used in regulating the operation of file size controller 46 in accordance with an embodiment of the present invention. The parameters of this curve are stored in configuration module 70. Controller 46 uses a virtual buffer model to constantly monitor the size of the encoded bit stream in order to select the frame budget for each frame. The model provides a steady-state working point 80 for P-frames, as well as an intermittent working point 82 for I-frames and overflow curve 84, whose use is described below. The working points and overflow curve are defined with reference to a nominal frame budget, in bits/frame, which is given by the file size limitation that is imposed on the video sequence as a whole (TargetSize), and by the total number of frames in the video sequence (Nframes):

NominalFrameBudget=TargetSize/Nframes.

The virtual buffer occupancy (referred to hereinbelow as buffer_level) represents the cumulative deviation of the encoded frame sizes, in bits, relative to the NominalFrameBudget. Positive buffer occupancy means that there is an accumulated shortage of bits relative to the nominal frame budget. On the other hand, negative buffer_level indicates there is are extra bits available for encoding relative to the nominal frame budget.

The virtual buffer size (BufferSize) defines the maximal number of bits the virtual buffer can hold. BufferSize can be defined as a function of NominalFrameBudget, for example: BufferSize=SizeFactor*NominalFrameBudget. The parameter SizeFactor may conveniently be set to the value three, although larger or smaller buffer sizes may be used depending on considerations such as application requirements and characteristics of the video sequence that is to be encoded.

Working points 80 and 82 are typically defined as a fraction of the virtual buffer size. To ensure that the encoded video file meets the file size constraint, working point 80 (WP) is set to zero or to some small negative value, such as −0.02*BufferSize. I-frame working point 82 (IP) represents the recommended buffer occupancy after encoding an I-frame with a relatively large number of bits. The value of IP reflects the ability of the video encoding module to handle a temporarily large bit shortage that may occur under these circumstances. Setting a high IP value results in better I-frame quality but may increase the probability of dropping frames subsequently in the sequence or degrade the quality of the few next P frames following the I frame.

Buffer overflow curve 84 determines the overflow value (OVP) for each frame, in terms of excess bits permitted for that frame. When the buffer occupancy exceeds OVP for a given frame, controller 46 instructs encoder 48 to drop the frame. In order to ensure that the TargetSize limitation will be met, the overflow value should drop monotonically over at least the final portion of the video sequence, so that for the last frame in the sequence OVP=0. The maximal overflow value in curve 84 should not exceed BufferSize. The linearly-decreasing shape of curve 84 in FIG. 6 meets these criteria. Alternatively, other sorts of overflow curves may be defined, such as those shown in FIGS. 7A and 7B, depending on the desired frame dropping and image quality behavior of the encoder over the duration of the video sequence.

Frame-level module 72 (FIG. 5) determines the frame budget (in bits) for each frame based on the current buffer level, as defined above. Module 72 sets the buffer level for the first frame in the sequence to zero and updates the buffer level for each subsequent frame j using the recursive formula:

buffer_level(j)=buffer_level(j−1)+EncodedFrameSize(j−1)−NominalFrameBudget

After encoder 48 has encoded frame j, module 72 calculates buffer_level(j+1) using the above formula. If this value exceeds the OVP for frame j, module 72 instructs the encoder to drop frame j, and returns the buffer level value to buffer_level(j).

Module 72 calculates the frame budget for each frame, based on the current buffer level, according to the I/P frame type indication. For I-frames:

FrameBudget=(IP−buffer_level)+NominalFrameBudget wherein IP is the I-frame working point, as defined above. For P-frames:

FrameBudget=(WP−buffer_level)*(1−K)+NominalFrameBudget wherein WP is the P-frame working point, and K is a number in the range 0 to 1. The value of K determines how far the frame budget can go above or below the nominal budget, depending on the buffer level value relative to the working point. A higher value of K decreases the frame budget fluctuations around the nominal budget. For example, K may be set to 0.7 for several P-frames following an I-frame to avoid a sharp decrease in quality, after which K is set to 0.5 until the next I-frame is encountered. The frame budget may be restricted to fall within predetermined lower and upper bounds, so that when module 72 computes a value below the lower bound or above the upper bound, it simply sets the frame budget to the lower or upper bound value, respectively. For example, the frame budget may be bounded between 0.15 and 6.0 times the nominal frame budget.

In addition to computing the frame budget, as noted above, frame-level module 72 computes the QPF for each frame, depending on the QP of the preceding frame. For the first frame in the sequence, QPF may be give by:

$$QPF_{initial} = QP_0 - 6 \times \log_2\left(\frac{BPP}{BPP_0}\right)$$

The values of the parameters in this formula may be set heuristically, for example, $QP_0=28$, $BPP_0=0.16$, and BPP is the nominal number of bits per pixel given by BPP=NominalFrameBudget/(Width*Height), using the width and height of the frame in pixels. For subsequent frames, module 72 calculates QPF based on LastQP, which is the average QP over the basic-units of the previous frame, and on the ratio between the buffer level and the nominal frame budget. For I-frames or a first P-frame after an I-frame, QPF may simply be set to LastQP. For P-frames that follow a P-frame, QPF is calculated as follows:

$$QPF = LastQP + \text{round}\left[\alpha1 \cdot \frac{\text{Buffer\_level}}{\text{NominalFrameBudget}}\right]$$

The second term in this expression causes QPF to increase as the virtual buffer fills, and decrease when the buffer level drops below the nominal level. The value of α1 dictates how strongly the frame budget will be pulled down in order to keep close to the required buffer level. The smaller α1, the smaller will be the changes in QP between frames. Small α1 values, such as values in the range 0.2-0.5, will prevent drastic quality differences between subsequent frames but might cause a temporary buffer overflow. Alternatively, α1 may be set to a larger value, such as 1. QPF is limited, however, to the allowed range of QP values of the encoder, as provided by the applicable encoding standard.

Basic unit-level module 74 (FIG. 5) iteratively generates QP values for each basic unit processed by encoder 48. The QP value for the first basic unit in each frame is set to QPF, as defined above. The QP value for each subsequent basic unit i is given by:

$$QP(i)=QP(i-1)+\text{Step}(i),$$

wherein $$\text{Step}(i) = \text{round}\left[\alpha2 \cdot \sum_{n=1}^{i}\left(\frac{BUbits(n)}{BUbudget} - 1\right)\right].$$

Here BUbits is the data size of each encoded basic unit, while BUbudget is the number of bits per basic unit, given by FrameBudget divided by the number of basic units in the frame. The parameter α2 is chosen so as to avoid visible quality changes between basic units, and the value of Step(i) is not allowed to exceed a preset maximum for similar reasons. For example, α2 may be set to the value eight, and Step(i) may similarly be limited to values no greater than eight. Furthermore, QP is limited to the range of quantization parameters permitted by the encoding standard.

Figure 7A:
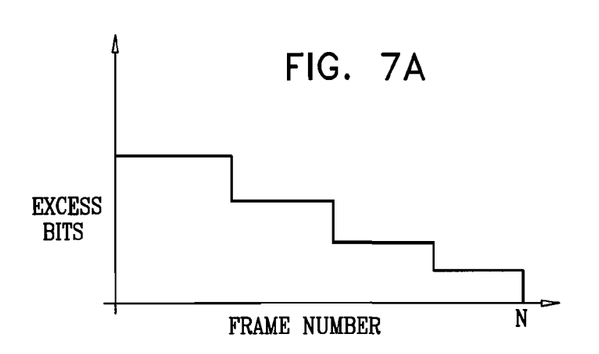
FIGS. 7A and 7B are schematic plots of buffer overflow curves, in accordance with alternative embodiments of the present invention.
Figure 7B:
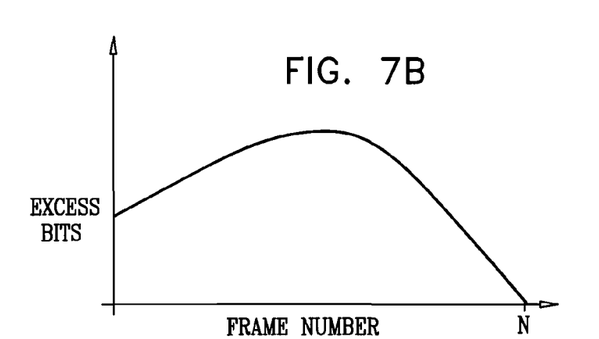

FIGS. 7A and 7B are schematic plots of buffer overflow curves that are used in regulating the operation of file size controller 46, in accordance with alternative embodiments of the present invention. Curve 84 (FIG. 6) gives a probability of frame dropping that increases continuously over the duration of the video sequence. By contrast, the frame drop probability increases by steps when the curve of FIG. 7A is used. On the other hand, the curve of FIG. 7B allocates more bits (higher bandwidth) to the middle of the video sequence, so that the frame drop probability may actually decrease initially, then increases toward the end of the sequence.

Figure 8A:
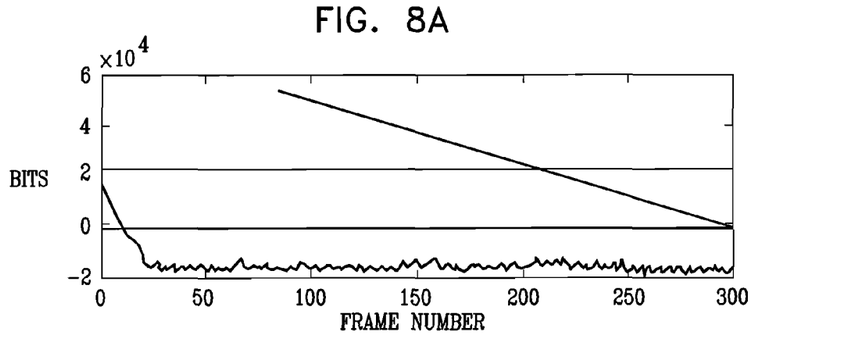
FIGS. 8A and 8B are schematic plots showing buffer levels during encoding of an image sequence subject to different target file size constraints, in accordance with an embodiment of the present invention.
Figure 8B:
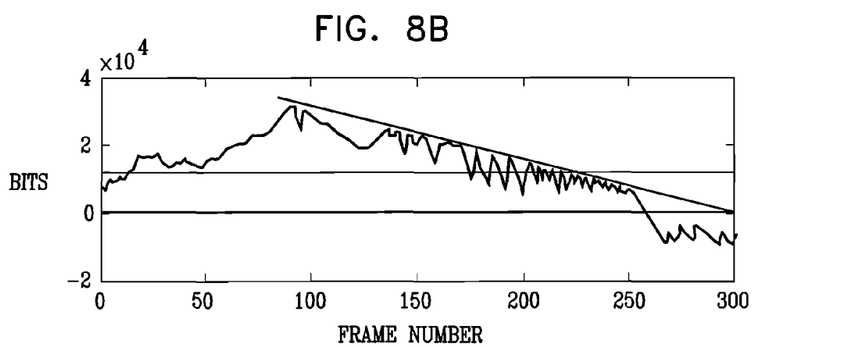

FIGS. 8A and 8B are schematic plots showing buffer levels during encoding of an image sequence subject to different target file size constraints, in accordance with an embodiment of the present invention. In FIG. 8A, the target file size is set to twice the value that is used in FIG. 8B. The P-frame working point (WP) was set to −0.02 times the buffer size in both cases. The larger nominal frame budget in FIG. 8A resulted in a higher value of the I-frame working point (IP) (indicated by a horizontal line in the figures) and higher OVP values of the overflow curve.

Because of the large buffer size in FIG. 8A, only the initial I-frame causes an excursion of the buffer fill level above the nominal. Thereafter, the encoded frame size converged to the working point and remained near the working point for the duration of the sequence.

In FIG. 8B, because of the low nominal frame budget, the buffer level increased over approximately the first ninety frames until it reached the overflow curve, resulting in dropping of a frame (indicated by the notch at about frame number 100). The decreasing OVP caused further frames to be dropped, particularly in the interval between frames number 150 and 200, which was presumably a high-motion segment of the sequence. Nonetheless, by the end of the sequence, the buffer level converged to the working point, meaning that the encoded sequence as a whole met the target size limitation.

These results demonstrate that the internal feedback mechanism used by controller 46 enables encoding module 44 to satisfy different file size constraints without requiring more than a single pass through the video sequence for each target file size. Even when bandwidth is sparse, as in the example of FIG. 8B, controller 46 spreads the loss of frames and reduction of image quality evenly over the sequence, while using nearly all of the available bandwidth. Thus, the quality of the image sequence that is decoded and displayed at the receiver is consistent and roughly as good as can be achieved within the available bandwidth.

Although the embodiments described above make reference, for the sake of clarity and convenience, to aspects of the H.264 Recommendation, the methods used in these embodiments may also be carried out, mutatis mutandis, using other methods of image sequence encoding that have variable compression parameters, as in standards promulgated by the Motion Pictures Expert Group (MPEG), for example. Furthermore, although the above embodiments are described in the context of system 20, the principles of the present invention may similarly be applied in substantially any other context in which image sequences are encoded to meet target file size requirements. For example, the methods described above may be used in image transcoding not only for purposes of transmission to clients over communication networks, but also for purposes of storage, wherein the storage medium is connected to the transcoding processor by a suitable communication link.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
   receiving an image sequence comprising a succession of image frames for encoding in an image sequence file;
   specifying a target size of the image sequence file;
   generating the image sequence file by performing for each current frame of the succession:
      monitoring a cumulative data volume of the compressed image frames preceding the current frame;
      calculating a budget for the current frame responsively to the cumulative data volume and the target size of the image sequence file;
      selecting at least one variable compression parameter for the current frame, responsively to the budget calculated for the current frame; and
      encoding the current frame responsively to the at least one selected variable compression parameter; and
   outputting the image sequence file for transmission over a communication link.

2. The method according to claim 1, wherein the at least one variable compression parameter comprises a quantization parameter.

3. The method according to claim 2, wherein encoding the succession of the image frames comprises dividing each of the image frames into a plurality of basic units, and setting the quantization parameter respectively for each of the basic units in each of the image frames.

4. The method according to claim 1, wherein the at least one variable compression parameter comprises a skip frame parameter, which is set so as to cause at least one of the image frames to be dropped from the image sequence file.

5. The method according to claim 1, wherein encoding the succession of the image frames comprises:
   defining a virtual buffer size responsively to the target size;
   defining a buffer overflow curve, which decreases monotonically over at least a final portion of the succession of the image frames, indicating an amount by which a data volume at each frame in the image sequence file is permitted to exceed a working point indicated by the virtual buffer size; and
   controlling the variable compression parameter while encoding the data so that the data volume remains within a bound indicated by the buffer overflow curve.

6. The method according to claim 5, wherein controlling the variable compression parameter comprises dropping a given frame from the image sequence file upon determining that inclusion of the given frame in the image sequence file will cause the data volume to exceed the bound indicated by the buffer overflow curve for the given frame.

7. The method according to claim 1, wherein encoding the succession of the image frames comprises compressing the image sequence in a single pass through the succession of the image frames.

8. The method according to claim 1, wherein the file size is no less than 98% of the target size.

9. The method according to claim 1, wherein said image sequence file having a file size that is no less than 90% of said target size, and, responsive to said image sequence file being greater than said target size, discarding at least one of said encoded image frames of said image sequence file thereby reducing the size of said image sequence file to be less than said target size.

10. The method according to claim 1, wherein calculating the budget for the current frame comprises calculating a cumulative deviation of the cumulative data volume from a nominal frame budget determined as the file target size divided by a number of images in the succession of frames.

11. The method according to claim 1, wherein outputting the image sequence file comprises outputting after compressing the entire succession of image frames.

12. Apparatus for processing data, comprising:
   a memory, which is configured to receive an image sequence comprising a succession of image frames for encoding in an image sequence file; and
   a processor, which is coupled to generate the image sequence file by performing for each current frame of the succession:
      monitor a cumulative data volume of the compressed image frames preceding the current frame;
      calculate a budget for the current frame responsively to the cumulative data volume and the target size of the image sequence file;

select at least one variable compression parameter for the current frame, responsively to the budget calculated for the current frame; and encode the current frame responsively to the at least one selected variable compression parameter, and to output the image sequence file for transmission over a communication link.

13. The apparatus according to claim 12, wherein the at least one variable compression parameter comprises a quantization parameter.

14. The apparatus according to claim 13, wherein the processor is configured to divide each of the image frames into a plurality of basic units, and to set the quantization parameter respectively for each of the basic units in each of the image frames.

15. The apparatus according to claim 12, wherein the at least one variable compression parameter comprises a skip frame parameter, which is set by the processor so as to cause at least one of the image frames to be dropped from the image sequence file.

16. The apparatus according to claim 12, wherein the processor is configured to encode the succession of the image frames by defining a virtual buffer size responsively to the target size, defining a buffer overflow curve indicating an amount by which a data volume at each frame in the image sequence file is permitted to exceed a working point indicated by the virtual buffer size, and controlling the variable compression parameter while encoding the data so that the data volume remains within a bound indicated by the buffer overflow curve.

17. The apparatus according to claim 16, wherein the bound indicated by the buffer overflow curve decreases monotonically over at least a final portion of the succession of the image frames.

18. The apparatus according to claim 16, wherein the processor is configured to drop a given frame from the image sequence file upon determining that inclusion of the given frame in the image sequence file will cause the data volume to exceed the bound indicated by the buffer overflow curve for the given frame.

19. The apparatus according to claim 12, wherein the processor is configured to encode the succession of the image frames in a single pass through the succession of the image frames.

20. The apparatus according to claim 12, wherein the file size is no less than 98% of the target size.

21. A computer software product, comprising a non-transitory computer-readable medium in which program instructions are stored, which instructions, when read by a computer, cause the computer to receive an image sequence comprising a succession of image frames for encoding in an image sequence file, and to generate the image sequence file by performing for each current frame of the succession:

monitoring a cumulative data volume of the compressed image frames preceding the current frame;

calculating a budget for the current frame responsively to the cumulative data volume and the target size of the image sequence file;

selecting at least one variable compression parameter for the current frame, the budget calculated for the current frame, and encoding the current frame responsively to the at least one selected variable compression parameter; and to output the image sequence file for transmission over a communication link.

22. The product according to claim 21, wherein the at least one variable compression parameter comprises a quantization parameter.

23. The product according to claim 21, wherein the at least one variable compression parameter comprises a skip frame parameter, which is set by the computer so as to cause at least one of the image frames to be dropped from the image sequence file.

* * * * *